US011182953B2

(12) United States Patent
Hamilton et al.

(10) Patent No.: US 11,182,953 B2
(45) Date of Patent: Nov. 23, 2021

(54) MOBILE DEVICE INTEGRATION WITH A VIRTUAL REALITY ENVIRONMENT

(71) Applicant: LENOVO ENTERPRISE SOLUTIONS (SINGAPORE) PTE. LTD., Singapore (SG)

(72) Inventors: Jeffrey R. Hamilton, Pittsboro, NC (US); Ross L. Mickens, Cedar Grove, NC (US); Markesha F. Parker, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/242,285

(22) Filed: Jan. 8, 2019

(65) Prior Publication Data
US 2020/0219310 A1 Jul. 9, 2020

(51) Int. Cl.
*G06T 17/00* (2006.01)
*G02B 27/01* (2006.01)
*H04W 4/02* (2018.01)
*G06T 19/00* (2011.01)

(52) U.S. Cl.
CPC ............ *G06T 17/00* (2013.01); *G02B 27/017* (2013.01); *G06T 19/006* (2013.01); *H04W 4/026* (2013.01)

(58) Field of Classification Search
CPC ...... G06T 17/00; G06T 19/006; H04W 4/026; G02B 27/017; G02B 2027/014; G06F 3/017; G06F 3/011
USPC .......................................................... 345/633
See application file for complete search history.

(56) References Cited

U.S. PATENT DOCUMENTS

| 2013/0290876 | A1* | 10/2013 | Anderson | G06F 3/1423 715/761 |
| 2014/0340395 | A1* | 11/2014 | Mattila | H04N 13/275 345/420 |
| 2015/0143405 | A1* | 5/2015 | Hogan | H04N 21/4126 725/32 |
| 2016/0093105 | A1* | 3/2016 | Rimon | G06T 11/60 345/633 |
| 2017/0272838 | A1* | 9/2017 | Glazer | H04N 21/44218 |
| 2018/0095542 | A1* | 4/2018 | Mallinson | G06F 1/163 |
| 2018/0096519 | A1* | 4/2018 | Tokubo | A63F 13/211 |
| 2018/0150996 | A1* | 5/2018 | Gatta | G06F 3/013 |

OTHER PUBLICATIONS

Matney, *Oculus shows off Facebook Messenger video calls in virtual reality*, techcrunch.com (online), Oct. 6, 2016, 2 pages, URL: https://techcrunch.com/2016/10/06/oculus-shows-off-facebook-messenger-video-calls-in-virtual-reality/.

(Continued)

*Primary Examiner* — Jennifer Mehmood
*Assistant Examiner* — Kim Thanh T Tran

(57) ABSTRACT

Mobile device integration with a virtual reality environment may include: determining a location of a mobile device relative to a head-mounted display displaying a virtual environment; receiving a video stream mirroring a display of the mobile device; rendering, in the virtual environment, based on the location of the mobile device relative to the head-mounted display, a representation of the mobile device comprising the video stream; and outputting, to the head-mounted display, a rendering of the virtual environment comprising the representation of the mobile device.

20 Claims, 7 Drawing Sheets

(56) References Cited

OTHER PUBLICATIONS

Strange, *This is how calls and texts look in virtual reality, via the HTC Vive*, mashable.com (online), Apr. 16, 2016, 2 pages, URL: https://mashable.com/2016/04/16/vr-phone-call-htc-vive/#5F06Fry8TZqK.

* cited by examiner

MOBILE DEVICE INTEGRATION WITH A VIRTUAL REALITY ENVIRONMENT

BACKGROUND

Field of the Invention

The field of the invention is data processing, or, more specifically, methods, apparatus, and products for mobile device integration with a virtual reality environment.

Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Virtual reality headsets provide immersion in a virtual environment by fully encompassing the field of vision of a user with a head-mounted display. When a notification or incoming call is received by a mobile device of the user, the user may need to remove the head set to effectively interact with the mobile device.

SUMMARY

Mobile device integration with a virtual reality environment may include: determining a location of a mobile device relative to a head-mounted display; receiving a video stream mirroring a display of the mobile device; rendering, in a virtual environment, based on the location of the mobile device relative to the head-mounted display, a representation of the mobile device comprising the video stream; and outputting, to the head-mounted display, a rendering of the virtual environment comprising the representation of the mobile device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
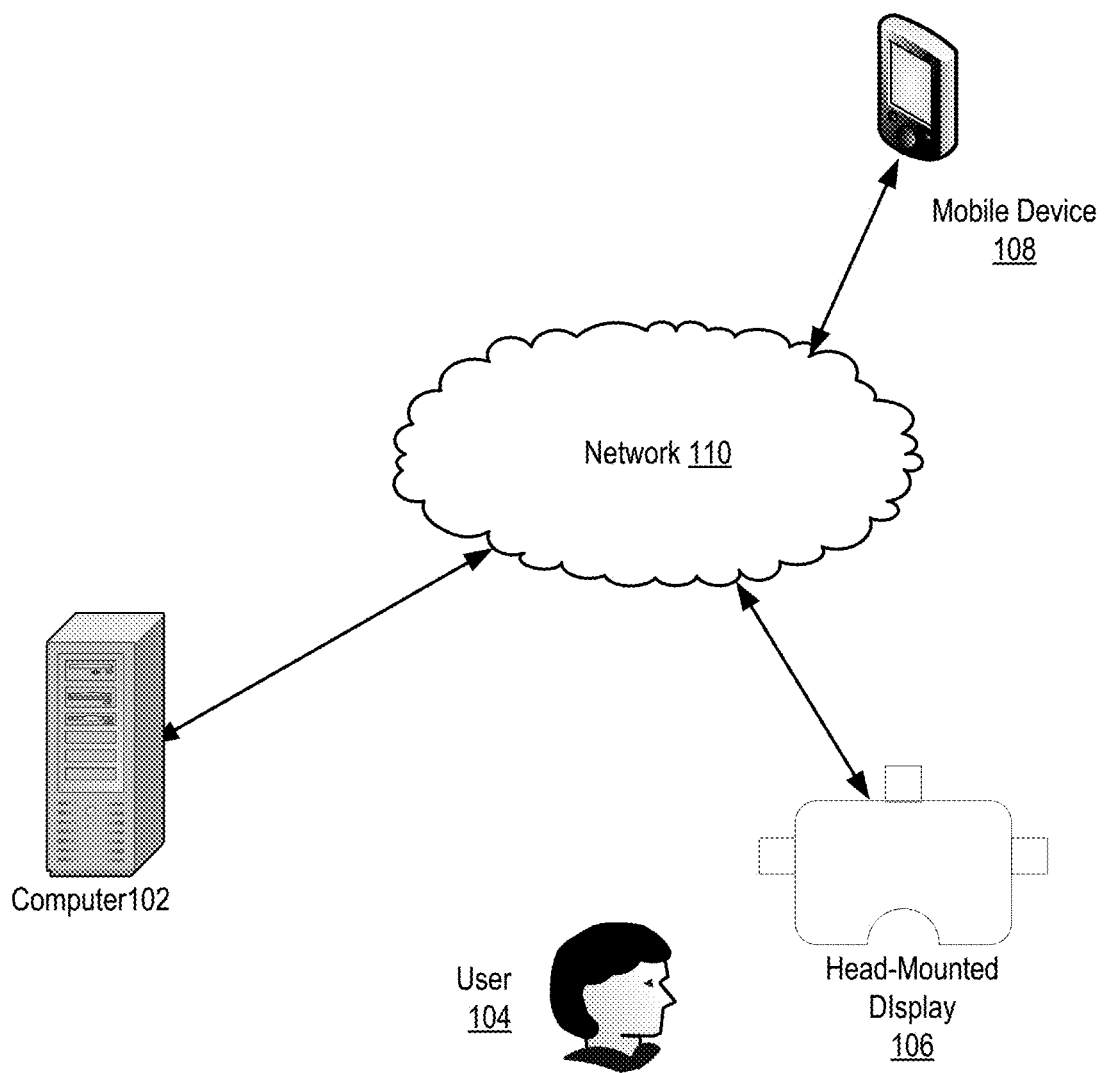
FIG. 1 is a diagram of an example system for mobile device integration with a virtual reality environment.

Exemplary methods, apparatus, and products for mobile device integration with a virtual reality environment in accordance with the present invention are described with reference to the accompanying drawings, beginning with FIG. 1. FIG. 1 sets forth a network diagram of a system configured for mobile device integration with a virtual reality environment according to embodiments of the present invention. The system of FIG. 1 includes a computer 102 (e.g., a desktop computer, a laptop computer, a server, etc.) configured for executing one or more software applications that generate and render a virtual environment. Examples of such software includes games, user interfaces, and the like. The virtual environment comprises a computer-generated representation of a three-dimensional space that may be interacted with via an input from a user 104.

The rendering of the virtual environment is output to a head-mounted display (HMD) 106. The HMD 106 comprises one or more displays for displaying the rendering of the virtual environment. For example, the HMD 106 may comprise two displays each configured for viewing by a separate eye of the user 104 in order to provide a stereoscopic three-dimensional image of the virtual environment to the user 104. Accordingly, the HMD 106 may include one or more straps, bands, etc. to affix the HMD 106 to the head of the user 104. The HMD 106 may also comprise one or more sensors to determine a head position and/or viewing angle of the user 104 (e.g., expressed as a three-dimensional vector) such that the virtual environment bay be rendered based on the head position and/or viewing angle of the user (e.g., rendering the virtual environment from the perspective of one or more cameras angled according to the head position and/or viewing angle of the user). The computer 102 may also be communicatively coupled to one or more sensors configured to determine a position of the user and/or the HMD 106 in order to more accurately render the virtual environment from a simulated position of the user 104 in the virtual environment.

The HMD 106 may also comprise one or more sensors (e.g., infrared sensors, cameras, etc.) to facilitate determining a position of a mobile device 108 relative to the HMD 106. The mobile device 108 may comprise a cellular phone, smart phone, tablet, laptop computer, portable gaming console, or other mobile computing device as can be appreciated. The location of the HMD 106 may include a distance from the HMD 106, an angle and/or orientation of the HMD 106, etc. Accordingly, the computer 102 may determine a location of the mobile device 108 relative to the HMD 106 based on data from the one or more sensors of the HMD 106.

The computer 102 may also determine the location of the mobile device 108 based on data received from one or more orientation sensors of the mobile device 108. For example, the mobile device 108 may comprise one or more compasses, gyroscopes, etc. configured for determining an angle, rotation, or direction of the mobile device 108. The computer 102 may then determine an orientation and/or angle of the mobile device 108 based on data received from the one or more orientation sensors of the mobile device.

The computer 102 may also receive, from the mobile device 108, a video stream mirroring a display of the mobile device 108. For example, the mobile device 108 may provide the video stream to the computer 102 via the AirPlay™ protocol, or another protocol for device display mirroring. The computer 102 may be configured 102 to receive the video stream from the mobile device 108 in response to one or more predefined conditions. For example, the computer 102 may request the video stream and/or sync with the mobile device 108 in response to determining that the location of the mobile device 108 is within an angle relative to the HMD 108 (e.g., a simulated or approximated field of view). A physical object (e.g., the mobile device 108) is considered to be within a simulated field of view when the location of the mobile device 108 relative to the HMD 106 falls within an area corresponding to the field of view and draw distance of the virtual environment as displayed by the HMD 106. Thus, the mobile device 108 only sends the video stream when within the simulated or approximated field of view, saving on processing resources, network resources, and battery power of the mobile device 108 and/or the computer 102. The computer 102 may also request the video stream and/or sync with the mobile device 108 in response to determining that the mobile device 108 has moved (e.g., based on motion sensors and/or orientation sensors of the mobile device 108), thereby indicating that the mobile device 108 may be moved within a simulated field of view of the mobile device 108.

The computer 102 may then render, based on the location of the mobile device 108 relative to the HMD 106, a representation of the mobile device 108 in the virtual environment. Rendering, based on the location of the mobile device 108 relative to the HMD 106, the representation of the mobile device 108 may comprise rendering, relative to a user perspective in the virtual environment, the representation of the mobile device 108 at a relative distance, angle, and/or orientation corresponding to the relative distance, angle, and/or orientation between the mobile device 108 and the HMD 106. The representation of the mobile device 108 may comprise the video stream from the mobile device 108. Thus, the representation of the mobile device 108 in the virtual environment may mirror the display of the mobile device 108. The representation of the mobile device 108 may also mirror the display of the mobile device 108 by other approaches. For example, instead of receiving a video stream from the mobile device 108, the computer 102 may receive metadata describing a state of the mobile device 108 (e.g., a description of icon placement, an indication of an image or video being displayed). The computer 102 may then render, based on the metadata, one or more images mirroring the display of the mobile device 108.

The representation of the mobile device 108 may be scaled (e.g., upscaled or downscaled) within the virtual environment. In other words, the representation of the mobile device 108 may appear to occupy a larger or smaller virtual space when compared to the physical space occupied by the actual mobile device 108. The computer 102 may then output the rendering of the virtual environment comprising the representation of the mobile device 108 to the HMD 106. Thus, the representation of the mobile device 108 appears in the virtual environment as rendered by the computer 102 and displayed by the HMD 106.

As the mobile device 108 and/or HMD 106 move, the computer 102 may continue to determine an updated location of the mobile device 108 relative to the HMD 106. The computer 102 may then render the representation of the mobile device 108 in the virtual environment based on an updated location of the mobile device 108. Accordingly, the representation of the mobile device 108 appears as a component of the virtual environment, allowing a user 104 to fully interact with the mobile device 108 without removing the HMD.

To facilitate rendering the representation of the mobile device 108 in the virtual environment, the computer 102 may determine a three-dimensional model associated with the mobile device 108. For example, the three-dimensional model may comprise a model selected according to a user input (e.g., indicated in a setting or user profile). As another example, the three-dimensional model may be based on executed software associated with the virtual environment. For example, a game application may comprise one or more models of a mobile device 108 that may be rendered such that the representation of the mobile device 108 conforms to a particular aesthetic or artistic theme of the application.

Determining the three-dimensional model may also comprise receiving, from the mobile device 108 or another source, a device identifier. The device identifier may comprise a serial number, a Media Access Controller (MAC) address, or other identifier. The computer 102 may then query a database, lookup table, or other data structure with the device identifier and receive, in response to the query, a three-dimensional model or an indication of a three-dimensional model for use in rendering the representation of the mobile device 108.

To facilitate interacting with the mobile device 108, the computer 102 may pause one or more operations associated with the virtual environment. Pausing one or more operations associated with the virtual environment may comprise pausing a game application, an animation cycle, or other operation. Pausing one or more operations associated with the virtual environment may be performed in response to one or more predefined conditions. For example, the computer 102 may pause the one or more operations associated with the virtual environment in response to the mobile device 108 falling within a simulated field of view of the HMD 106. In other words, the computer 102 may pause the one or more operations within the virtual environment in response to the representation of the mobile device 108 failing within the simulated field of view and therefore being rendered. The computer 102 may pause the one or more operations associated with the virtual environment in response to receiving a notification from the mobile device (e.g., an incoming text message, an incoming phone call, etc.). The computer 102 may also pause the one or more operations in response to the virtual environment in response to an input to a user interface element corresponding to the received notification (e.g., a selection of a popup comprising the notification. The computer 102 may pause the one or more operations associated with the virtual environment in response to a user input to the mobile device 108 (e.g., an unlocking, an answering of a phone call, an opening of an application on the mobile device) and/or in response to movement of the mobile device 108 as determined by the one or more orientation sensors of the mobile device 108.

The computer 102, HMD 106, and mobile device 108 may each be connected to each other via a network 110. The network 110 may comprise one or more wired networks, wireless networks, Local Area Networks (LANs), Wide Area Networks (WANs), Personal Area Networks, mesh networks, cellular networks, internets, intranets, or combinations thereof.

It is understood that the functionality described above with respect to the computer 102 may be performed at least partially or entirely by the HMD 106. For example, the HMD 106 may comprise a self-contained computing device that executes applications associated for the virtual environment and rendering the virtual environment for display without the need of an external computer 102. As another example, the HMD 106 may facilitate at least a portion of rendering of the virtual environment in conjunction with the computer 102.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Mobile device integration with a virtual reality environment in accordance with the present invention is generally implemented with computers, that is, with automated computing machinery. For further explanation, therefore, FIG. 2 sets forth a block diagram of automated computing machinery comprising an exemplary computer 102 configured for mobile device integration with a virtual reality environment according to embodiments of the present invention. The computer 102 of FIG. 2 includes at least one computer processor 202 or 'CPU' as well as random access memory 204 ('RAM') which is connected through a high speed memory bus 206 and bus adapter 208 to processor 202 and to other components of the computer 102.

Figure 2:
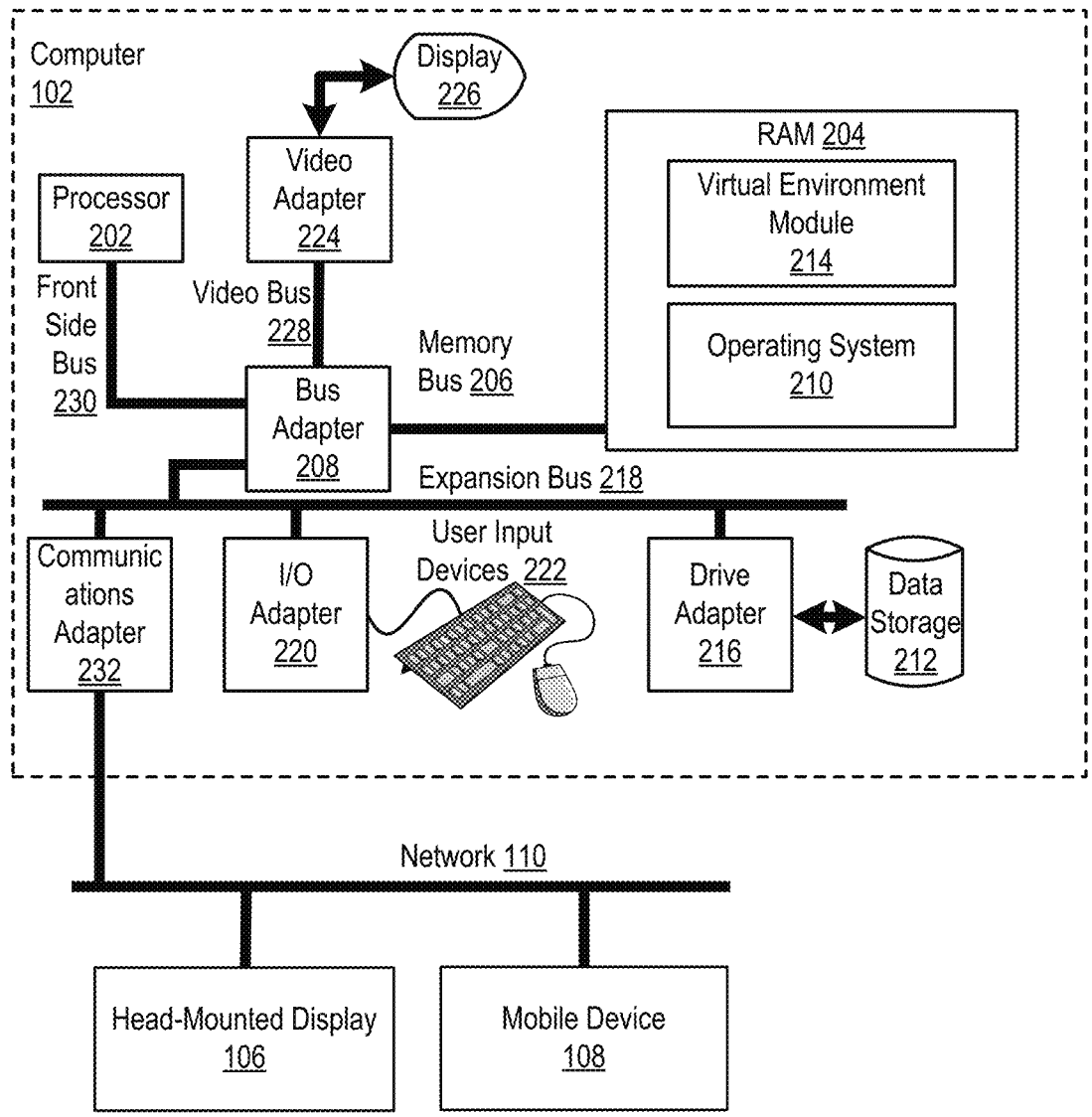
FIG. 2 is a block diagram of an example computer configured for mobile device integration with a virtual reality environment.

Stored in RAM 204 is an operating system 210. Operating systems useful in computers configured for mobile device integration with a virtual reality environment according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the virtual environment module 214 a module for mobile device integration with a virtual reality environment according to embodiments of the present invention.

The computer 102 of FIG. 2 includes disk drive adapter 216 coupled through expansion bus 218 and bus adapter 208 to processor 202 and other components of the computer 102. Disk drive adapter 216 connects non-volatile data storage to the computer 102 in the form of data storage 212. Disk drive adapters useful in computers configured for mobile device integration with a virtual reality environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 102 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 102 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary computer 102 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for mobile device integration with a virtual reality environment according to embodiments of the present invention include modems for wired dial-up communications, Ethernet (IEEE 802.3) adapters for wired data communications, and 802.11 adapters for wireless data communications.

The communications adapter 232 is communicatively coupled to a network 110 that also includes the HMD 106 and mobile device 108.

Figure 3:
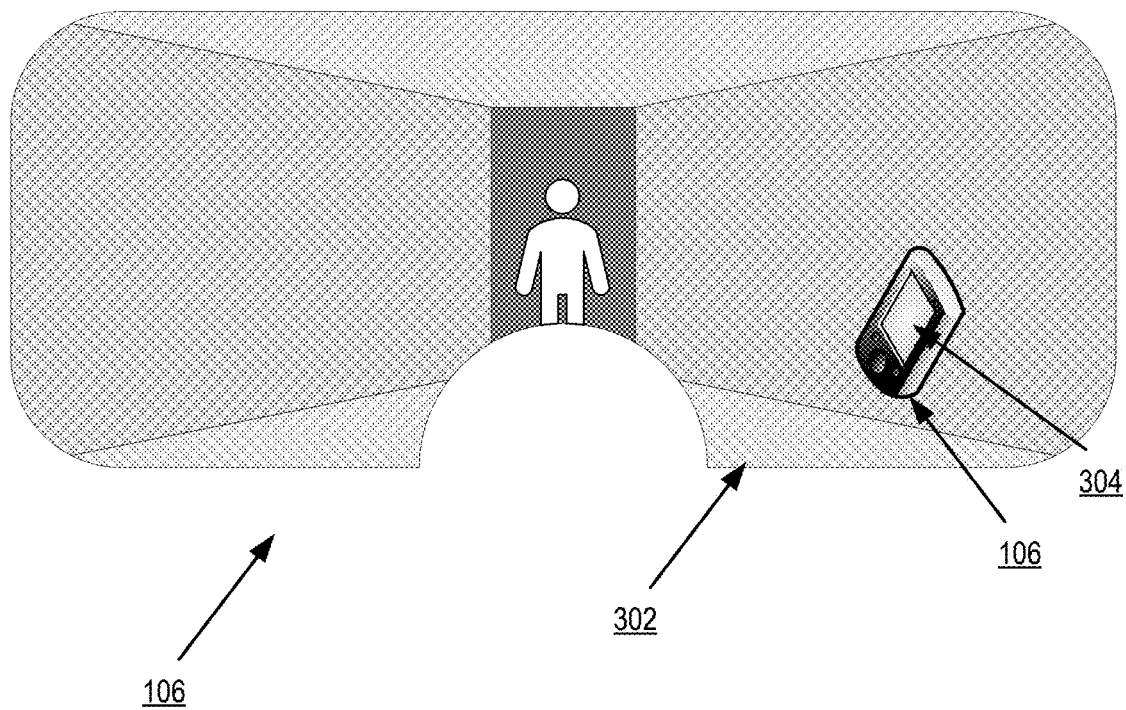
FIG. 3 is an example user interface for mobile device integration with a virtual reality environment.

FIG. 3 shows an example user interface for mobile device integration with a virtual reality environment. The example user interface shows a rendering of a virtual environment 302 displayed by an HMD 106. In this example, the virtual environment 302 shows a user perspective camera looking down a hallway toward a human model. A representation of a mobile device 108 is rendered within the virtual environment 302. The location, angle, and/or orientation of the representation of the mobile device 108 corresponds to a current location, angle, and/or orientation of the mobile device 108 relative to the HMD 106. Thus, the representation of the mobile device 108 in the virtual environment as viewed by an in-game camera matches the mobile device 108 as would be seen by a user 104 were their field of vision not encompassed by the HMD 106. The display 304 of the representation of the mobile device 108 displays a video stream from the mobile device 108 mirroring the display of the mobile device 108.

Figure 4:
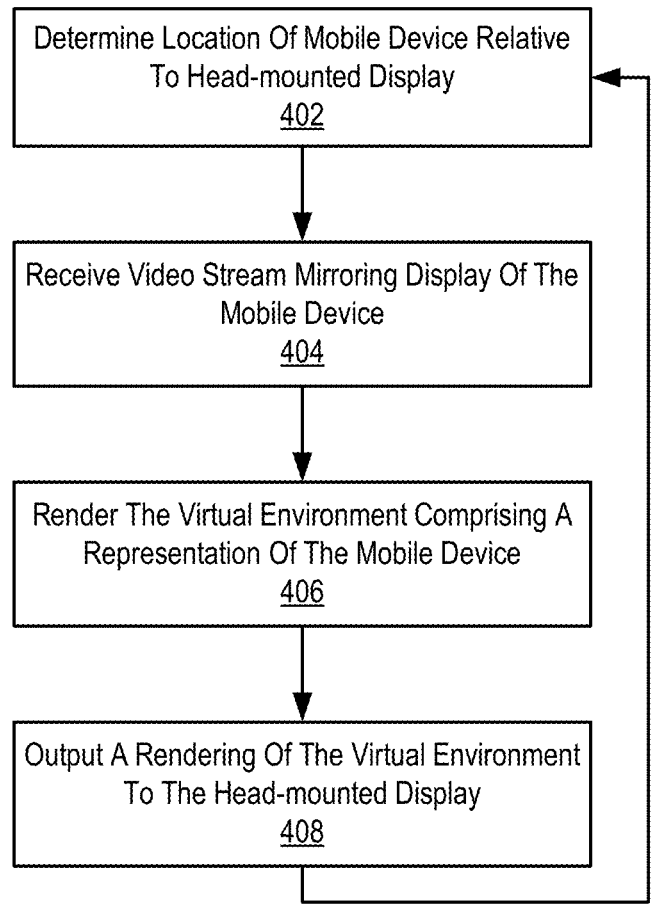
FIG. 4 is a flowchart of an example method for mobile device integration with a virtual reality environment.

For further explanation, FIG. 4 sets forth a flow chart illustrating an exemplary method for mobile device integration with a virtual reality environment according to embodiments of the present invention that includes determining 402 a location of a mobile device 108 relative to a head-mounted display (HMD) 106 (e.g., by a computer 102). Determining 402 location of the mobile device 108 relative to the HMD 106 may comprise determining a distance, angle, and/or orientation of the mobile device 108 relative to the HMD 106.

The method of FIG. 4 may also comprise receiving 404 (e.g., by the computer 102), from the mobile device 108, a video stream mirroring a display of the mobile device 108. For example, the mobile device 108 may provide the video stream via the AirPlay™ protocol, or another protocol for device display mirroring. Receiving the video stream mirroring the display of the mobile device 108 may comprise receiving the video stream from the mobile device 108 in response to one or more predefined conditions. For example, the computer 102 may request the video stream and/or sync with the mobile device 108 in response to determining that the location of the mobile device 108 is within an angle relative to the HMD 108 (e.g., a simulated or approximated field of view). A physical object (e.g., the mobile device 108) is considered to be within a simulated field of view when the location of the mobile device 108 relative to the HMD 106 falls within an area corresponding to the field of view and draw distance of the virtual environment as displayed by the HMD 106. Thus, the mobile device 108 only sends the video stream when within the simulated or approximated field of view, saving on processing resources, network resources, and battery power of the mobile device 108 and/or the computer 102. The computer 102 may also request the video stream and/or sync with the mobile device 108 in response to determining that the mobile device 108 has moved (e.g., based on motion sensors and/or orientation sensors of the mobile device 108), thereby indicating that the mobile device 108 may be moved within a simulated field of view of the mobile device 108.

The method of FIG. 4 may also comprise rendering 406, based on the location of the mobile device 108 relative to the HMD 106, a representation of the mobile device 108 in a virtual environment. Rendering, based on the location of the mobile device 108 relative to the HMD 106, the representation of the mobile device 108 may comprise rendering, relative to a user perspective in the virtual environment, the representation of the mobile device 108 at a relative distance, angle, and/or orientation corresponding to the relative distance, angle, and/or orientation between the mobile device 108 and the HMD 106. The representation of the mobile device 108 may comprise the video stream from the mobile device 108. Thus, the representation of the mobile device 108 in the virtual environment may mirror the display of the mobile device 108.

The method of FIG. 4 may further comprise outputting 308 (e.g., by the computer 102) the rendering of the virtual environment comprising the representation of the mobile device 108 to the HMD 106. Thus, the representation of the mobile device 108 appears in the virtual environment as rendered by the computer 102 and displayed by the HMD 106.

The method of FIG. 4 may then return to determining 402 the location of the mobile device 108 relative to the HMD 106. For example, as the mobile device 108 and/or HMD 106 move, the computer 102 may continue to determine an updated location of the mobile device 108 relative to the HMD 106. The computer 102 may then render the representation of the mobile device 108 in the virtual environment based on an updated location of the mobile device 108. Accordingly, the representation of the mobile device 108 appears as a component of the virtual environment, allowing a user 104 to fully interact with the mobile device 108 without removing the HMD.

Figure 5:
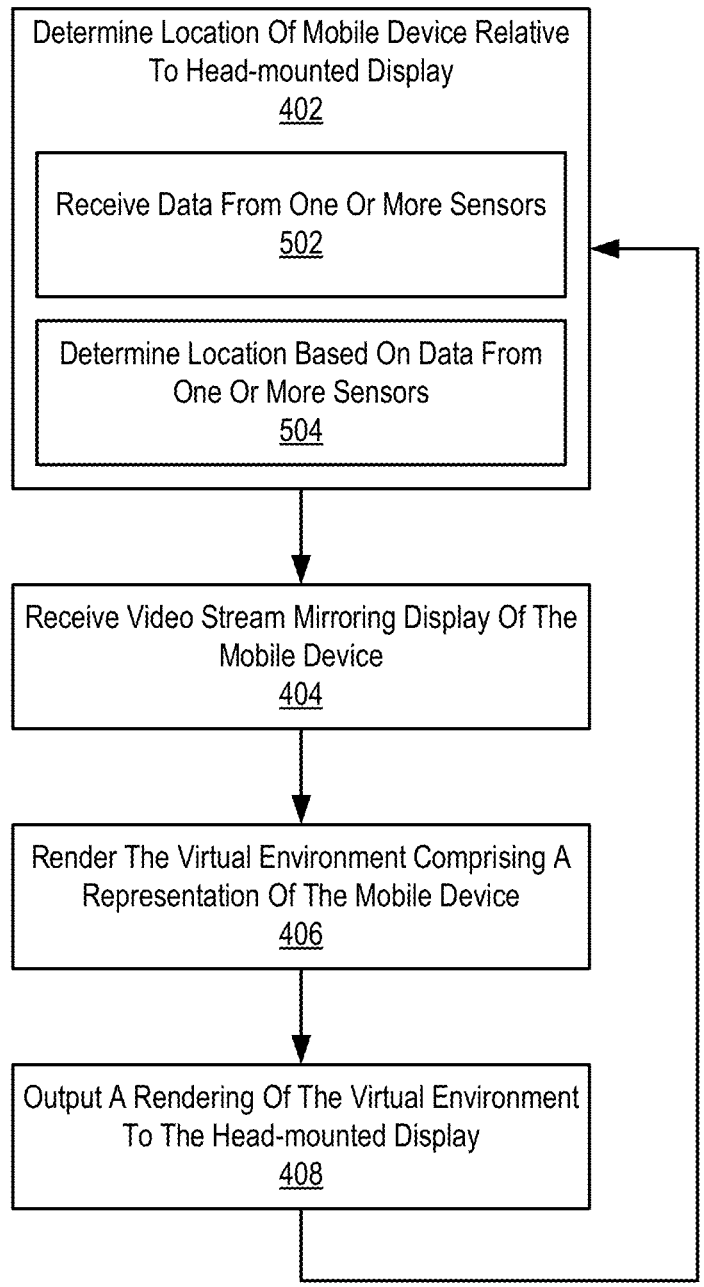
FIG. 5 is a flowchart of an example method for mobile device integration with a virtual reality environment.

For further explanation, FIG. 5 sets forth sets forth a flow chart illustrating an exemplary method for mobile device integration with a virtual reality environment according to embodiments of the present invention that includes determining 402 a location of a mobile device 108 relative to a head-mounted display 106; receiving 404 a video stream mirroring a display of the mobile device 108; rendering 406, in a virtual environment, based on the location of the mobile device 108 relative to the head-mounted display 106, a representation of the mobile device 108 comprising the video stream; and outputting 408, to the head-mounted display 106, a rendering of the virtual environment comprising the representation of the mobile device 108.

FIG. 5 differs from FIG. 4 in that determining 402 the location of the mobile device 108 relative to the HMD 106 comprises receiving 502 data from one or more sensors. For example, The HMD 106 may comprise one or more sensors (e.g., infrared sensors, cameras, etc.) to facilitate determining a position of a mobile device 108 relative to the HMD 106. Accordingly, receiving data from one or more sensors may comprise receiving data from one or more sensors included in the HMD 106. As another example, the mobile device 108 may comprise one or more orientation sensors, such as one or more compasses, gyroscopes, etc. configured for determining an angle, rotation, or direction of the mobile device 108. Accordingly, receiving data from one or more sensors may comprise receiving data from one or more orientation sensors of the mobile device 108. The method of FIG. 5 further differs from FIG. 4 in that determining 402 the location of the mobile device 108 relative to the HMD 106 comprises determining (504) the location of the mobile device 108 relative to the HMD 106 based on the data received from the one or more sensors.

Figure 6:
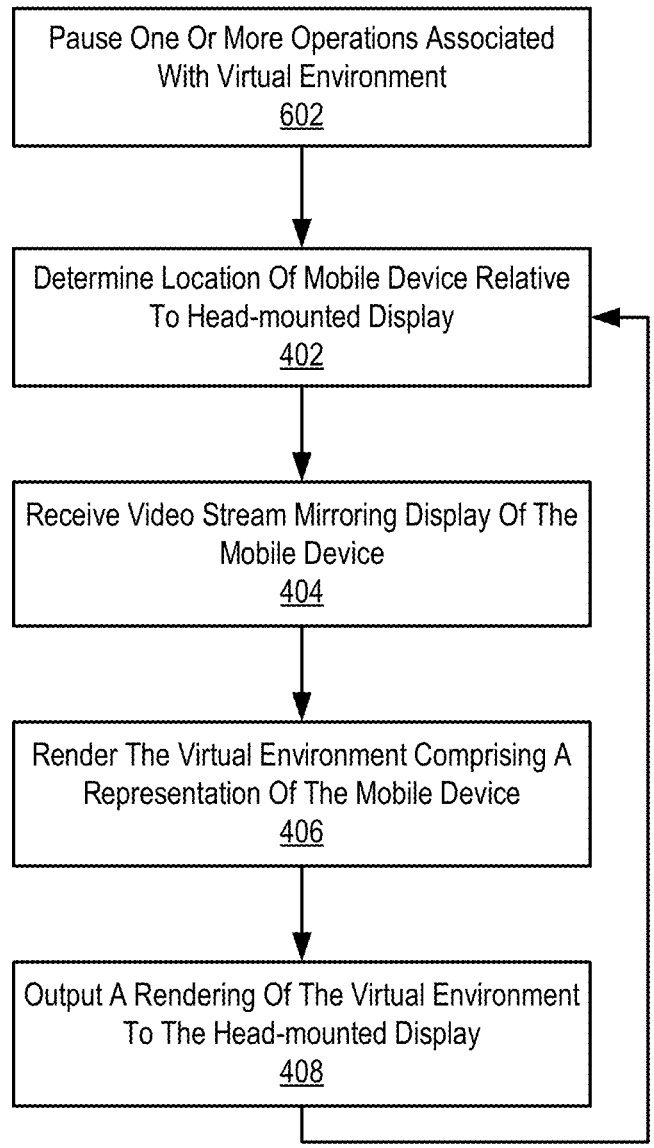
FIG. 6 is a flowchart of an example method for mobile device integration with a virtual reality environment.

For further explanation, FIG. 6 sets forth sets forth a flow chart illustrating an exemplary method for mobile device integration with a virtual reality environment according to embodiments of the present invention that includes determining 402 a location of a mobile device 108 relative to a head-mounted display 106; receiving 404 a video stream mirroring a display of the mobile device 108; rendering 406, in a virtual environment, based on the location of the mobile device 108 relative to the head-mounted display 106, a representation of the mobile device 108 comprising the video stream; and outputting 408, to the head-mounted display 106, a rendering of the virtual environment comprising the representation of the mobile device 108.

FIG. 6 differs from FIG. 4 in that the method of FIG. 6 comprises pausing 602 (e.g., by the computer 102) one or more operations associated with the virtual environment. Pausing one or more operations associated with the virtual environment may comprise pausing a game application, an animation cycle, or other operation. Pausing one or more operations associated with the virtual environment may be performed in response to one or more predefined conditions. For example, the computer 102 may pause the one or more operations associated with the virtual environment in response to the mobile device 108 falling within a simulated field of view of the HMD 106. In other words, the computer 102 may pause the one or more operations within the virtual environment in response to the representation of the mobile device 108 failing within the simulated field of view and therefore being rendered. The computer 102 may pause the one or more operations associated with the virtual environment in response to receiving a notification from the mobile device (e.g., an incoming text message, an incoming phone call, etc.). The computer 102 may also pause the one or more operations in response to the virtual environment in response to an input to a user interface element corresponding to the received notification (e.g., a selection of a popup comprising the notification. The computer 102 may pause the one or more operations associated with the virtual environment in response to a user input to the mobile device 108 (e.g., an unlocking, an answering of a phone call, an opening of an application on the mobile device) and/or in response to movement of the mobile device 108 as determined by the one or more orientation sensors of the mobile device 108.

Figure 7:
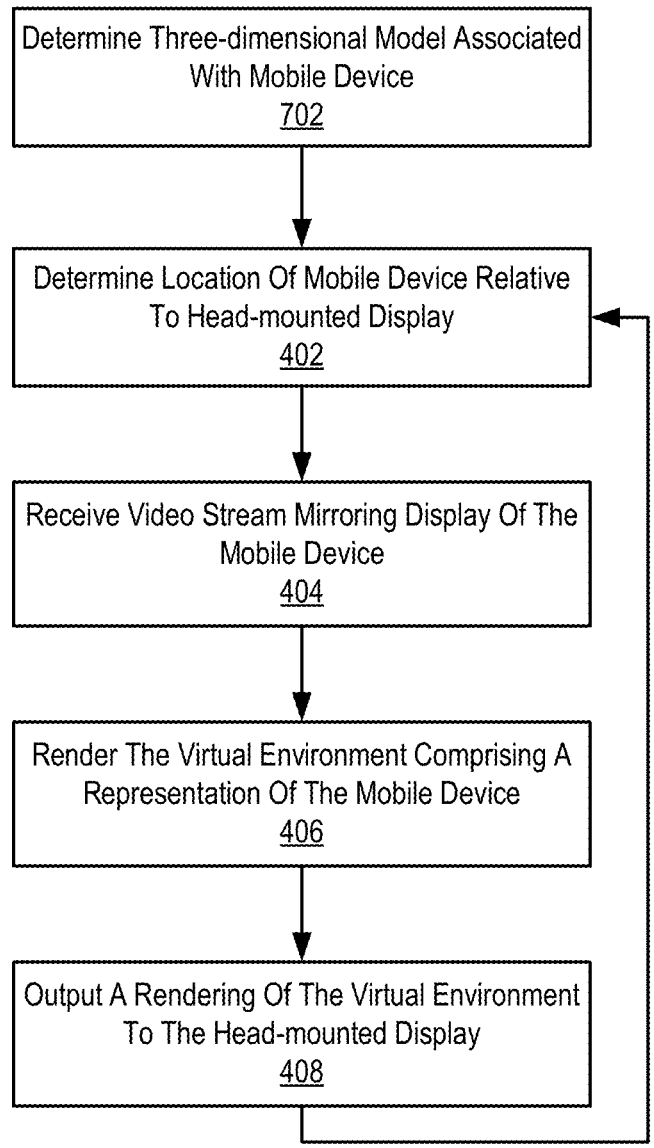
FIG. 7 is a flowchart of an example method for mobile device integration with a virtual reality environment.

For further explanation, FIG. 7 sets forth sets forth a flow chart illustrating an exemplary method for mobile device integration with a virtual reality environment according to embodiments of the present invention that includes determining 402 a location of a mobile device 108 relative to a head-mounted display 106; receiving 404 a video stream mirroring a display of the mobile device 108; rendering 406, in a virtual environment, based on the location of the mobile device 108 relative to the head-mounted display 106, a representation of the mobile device 108 comprising the video stream; and outputting 408, to the head-mounted display 106, a rendering of the virtual environment comprising the representation of the mobile device 108.

FIG. 7 differs from FIG. 4 in that the method of FIG. 7 comprises determining 702 (e.g., by the computer 102) a three-dimensional model associated with the mobile device 108. For example, the three-dimensional model may comprise a model selected according to a user input (e.g., indicated in a setting or user profile). As another example, the three-dimensional model may be based on executed software associated with the virtual environment. For example, a game application comprise one or more models of a mobile device 108 that may be rendered such that the representation of the mobile device 108 conforms to a particular aesthetic or artistic theme of the application.

Determining the three-dimensional model may also comprise receiving, from the mobile device 108 or another source, a device identifier. The device identifier may comprise a serial number, a Media Access Controller (MAC) address, or other identifier. The computer 102 may then query a database, lookup table, or other data structure with the device identifier and receive, in response to the query, a three-dimensional model or an indication of a three-dimensional model for use in rendering the representation of the mobile device 108.

In view of the explanations set forth above, readers will recognize that the benefits of mobile device integration with a virtual reality environment according to embodiments of the present invention may include:

The ability for a user experiencing a virtual environment through a head-mounted display to interact with a mobile device without removing the head-mounted display.

Allowing for full functionality of the mobile device to be integrated into the virtual environment.

Exemplary embodiments of the present invention are described largely in the context of a fully functional computer system for mobile device integration with a virtual reality environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of mobile device integration with a virtual reality environment, the method comprising:
    determining a location of a user's mobile device relative to a head-mounted display of the user;
    receiving a video stream mirroring a display of the mobile device;
    rendering, based on the location of the mobile device relative to the head-mounted display, a virtual environment comprising a representation of the mobile device at a location in the virtual environment corresponding to the determined location of the mobile device relative to the head-mounted display, wherein the representation of the mobile device includes a representation of the display of the mobile device including the video stream mirroring the display of the mobile device; and
    outputting, to the head-mounted display, a rendering of the virtual environment.

2. The method of claim 1 further comprising:
    determining a three-dimensional model of the mobile device;
    wherein rendering the representation of the mobile device is based on the three-dimensional model.

3. The method of claim 1, wherein the rendering of the virtual environment outputted to the head-mounted display of the user provides the user with an interface to physically interact with the mobile device.

4. The method of claim 1 further comprising pausing one or more operations associated with the virtual environment; and
    wherein a location of the representation of the mobile device within the virtual environment corresponds to the determined location of the mobile device relative to the head-mounted display, and wherein the mobile device is a phone.

5. The method of claim 4, wherein pausing the one or more operations associated with the virtual environment is performed in response to one or more of: a user input of the mobile device, a notification from the mobile device, a request for a communication session with the mobile device, or the location of the mobile device relative to the head-mounted display falling within a virtual field of vision of the head-mounted display.

6. The method of claim 1, wherein determining the location of the mobile device relative to the head-mounted display comprises:
    receiving data from one or more sensors of the head-mounted display; and
    determining, based on the data from the one or more sensors, the location of the mobile device, relative to the head-mounted display.

7. The method of claim 1, wherein determining the location of the mobile device relative to the head-mounted display comprises:
    receiving data from one or more orientation sensors of the mobile device; and
    determining, based on the data from the one or more orientation sensors, the location of the mobile device, relative to the head-mounted display.

8. An apparatus for mobile device integration with a virtual reality environment, the apparatus comprising a computer processor, a computer memory operatively coupled to the computer processor, the computer memory having disposed within it computer program instructions that, when executed by the computer processor, cause the apparatus to carry out the steps of:

determining a location of a user's mobile device relative to a head-mounted display of the user;
receiving a video stream mirroring a display of the mobile device;
rendering, based on the location of the mobile device relative to the head-mounted display, a virtual environment comprising a representation of the mobile device, including providing the user with an interface to physically interact with the mobile device, wherein the representation of the mobile device includes a representation of the display of the mobile device including the video stream mirroring the display of the mobile device; and
outputting, to the head-mounted display, a rendering of the virtual environment.

9. The apparatus of claim 8, wherein the steps further comprise:
determining a three-dimensional model associated with the mobile device;
wherein rendering the representation of the mobile device is based on the three-dimensional model.

10. The apparatus of claim 8, wherein the rendering of the virtual environment outputted to the head-mounted display of the user provides the user with an interface to physically interact with the mobile device.

11. The apparatus of claim 8, wherein the steps further comprise pausing one or more operations associated with the virtual environment; and
wherein a location of the representation of the mobile device within the virtual environment corresponds to the determined location of the mobile device relative to the head-mounted display, and wherein the mobile device is a phone.

12. The apparatus of claim 11, wherein pausing the one or more operations associated with the virtual environment is performed in response to one or more of: a user input of the mobile device, a notification from the mobile device, a request for a communication session with the mobile device, or the location of the mobile device relative to the head-mounted display falling within a virtual field of vision of the head-mounted display.

13. The apparatus of claim 8, wherein determining the location of the mobile device relative to the head-mounted display comprises:
receiving data from one or more sensors of the head-mounted display; and
determining, based on the data from the one or more sensors, the location of the mobile device, relative to the head-mounted display.

14. The apparatus of claim 8, wherein determining the location of the mobile device relative to the head-mounted display comprises:
receiving data from one or more orientation sensors of the mobile device; and
determining, based on the data from the one or more orientation sensors, the location of the mobile device, relative to the head-mounted display.

15. A computer program product for mobile device integration with a virtual reality environment, the computer program product comprising a non-transitory computer readable medium having computer program instructions embodied therewith that, when executed, cause a computer to carry out the steps of:
determining a location of a user's mobile device relative to a head-mounted display of the user;
determining a three-dimensional model of the mobile device;
receiving a video stream mirroring a display of the mobile device;
rendering, based on the three-dimensional model of the mobile device, a virtual environment comprising a representation of the mobile device at a location in the virtual environment corresponding to the determined location of the mobile device relative to the head-mounted display, wherein the representation of the mobile device includes a representation of the display of the mobile device including the video stream mirroring the display of the mobile device; and
outputting, to the head-mounted display, a rendering of the virtual environment.

16. The computer program product of claim 15, wherein the steps further comprise:
determining a three-dimensional model associated with the mobile device;
wherein rendering the representation of the mobile device is based on the three-dimensional model.

17. The computer program product of claim 15, wherein the rendering of the virtual environment outputted to the head-mounted display of the user provides the user with an interface to physically interact with the mobile device.

18. The computer program product of claim 15, wherein the steps further comprise pausing one or more operations associated with the virtual environment; and
wherein a location of the representation of the mobile device within the virtual environment corresponds to the determined location of the mobile device relative to the head-mounted display, and wherein the mobile device is a phone.

19. The computer program product of claim 18, wherein pausing the one or more operations associated with the virtual environment is performed in response to one or more of: a user input of the mobile device, a notification from the mobile device, a request for a communication session with the mobile device, or the location of the mobile device relative to the head-mounted display falling within a virtual field of vision of the head-mounted display.

20. The computer program product of claim 15, wherein determining the location of the mobile device relative to the head-mounted display comprises:
receiving data from one or more sensors of the head-mounted display; and
determining, based on the data from the one or more sensors, the location of the mobile device, relative to the head-mounted display.

* * * * *